(12) United States Patent
Dalsgaard et al.

(10) Patent No.: US 12,146,470 B2
(45) Date of Patent: Nov. 19, 2024

(54) METHOD FOR CHARGING AN ENERGY STORAGE SYSTEM USING A WIND TURBINE

(71) Applicant: VESTAS WIND SYSTEMS A/S, Aarhus N (DK)

(72) Inventors: Søren Dalsgaard, Hadsten (DK); Julio Xavier Vianna Neto, Århus N (DK); Kim Hylling Sørensen, Århus (DK); Poul Brandt Christensen, Ry (DK); Fabio Caponetti, Åbyhøj (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/290,979

(22) PCT Filed: Oct. 9, 2019

(86) PCT No.: PCT/DK2019/050301
§ 371 (c)(1),
(2) Date: May 3, 2021

(87) PCT Pub. No.: WO2020/088725
PCT Pub. Date: May 7, 2020

(65) Prior Publication Data
US 2022/0034295 A1 Feb. 3, 2022

(30) Foreign Application Priority Data
Nov. 2, 2018 (DK) .......................... PA 2018 70722

(51) Int. Cl.
*F03D 7/02* (2006.01)
*F03D 9/11* (2016.01)
*H02J 7/34* (2006.01)

(52) U.S. Cl.
CPC ................ *F03D 7/028* (2013.01); *F03D 9/11* (2016.05); *H02J 7/34* (2013.01); *F05B 2260/42* (2013.01); *F05B 2270/1033* (2013.01)

(58) Field of Classification Search
CPC .... F03D 7/028; F03D 9/11; H02J 7/34; F05B 2260/42; F05B 2270/1033
See application file for complete search history.

(56) References Cited

U.S. PATENT DOCUMENTS

2007/0100210 A1  5/2007  Selover et al.
2010/0308586 A1* 12/2010  Frank .................... F03D 7/0224
                                                                 290/44

(Continued)

FOREIGN PATENT DOCUMENTS

CN       1711675 A    12/2005
CN     101469668 A     7/2009

(Continued)

OTHER PUBLICATIONS

Danish Patent and Trademark Office 1st Technical Examination for Application No. PA 2018 70722 dated Jun. 25, 2019.

(Continued)

*Primary Examiner* — Viet P Nguyen
(74) *Attorney, Agent, or Firm* — Patterson + Sheridan, LLP (57) ABSTRACT

A method of charging an energy storage system, such as a battery, a capacitor, or a super capacitor, using a wind turbine is described. The method comprises establishing if turbine power production can be increased and establishing if the energy storage system is capable of taking a charge. If both conditions are met, the power generated by the wind turbine is increased above a rated power of the wind turbine and the additional power is used to charge the energy storage systems. A method of control is also disclosed.

22 Claims, 7 Drawing Sheets

(56) References Cited

U.S. PATENT DOCUMENTS

| | | | | |
|---|---|---|---|---|
| 2012/0061960 | A1* | 3/2012 | Yasugi | F03D 9/11 |
| | | | | 290/44 |
| 2012/0146331 | A1* | 6/2012 | Egedal | F03D 7/0276 |
| | | | | 290/44 |
| 2013/0207591 | A1 | 8/2013 | Reineccius | |
| 2014/0265330 | A1* | 9/2014 | Carkner | H01M 10/48 |
| | | | | 290/44 |
| 2014/0291989 | A1* | 10/2014 | Preindl | H02J 3/38 |
| | | | | 290/44 |
| 2014/0316592 | A1* | 10/2014 | Haj-Maharsi | H02S 10/12 |
| | | | | 290/44 |
| 2015/0322926 | A1* | 11/2015 | Caponetti | F03D 13/20 |
| | | | | 416/1 |
| 2015/0381089 | A1 | 12/2015 | Tarnowski et al. | |
| 2018/0187648 | A1 | 7/2018 | Spruce et al. | |
| 2018/0266392 | A1 | 9/2018 | Hovgaard et al. | |
| 2019/0148943 | A1* | 5/2019 | Scott | H02P 9/02 |
| | | | | 307/17 |
| 2020/0025174 | A1* | 1/2020 | Landa | F03D 7/0296 |

FOREIGN PATENT DOCUMENTS

| | | |
|---|---|---|
| CN | 102472250 A | 5/2012 |
| CN | 102664422 A | 9/2012 |
| CN | 102792581 A | 11/2012 |
| CN | 103827482 A | 5/2014 |
| CN | 104937263 A | 9/2015 |
| CN | 104995813 A | 10/2015 |
| CN | 107820540 A | 3/2018 |
| CN | 108350862 A | 7/2018 |
| CN | 108590961 A | 9/2018 |
| WO | 2013000474 A2 | 1/2013 |
| WO | 2015192110 A1 | 12/2015 |
| WO | 2017059862 A1 | 4/2017 |
| WO | 2020088725 A1 | 5/2020 |

OTHER PUBLICATIONS

PCT Notification of Transmittal of the International Search Report and the Written Opinion of the International Searching Authority, or the Declaration for Application No. PCT/DK2019/050301 dated Jan. 3, 2020.

European Patent Office, Communicaton pursuant to Article 94(3) EPC for Application 19 789 588.1-1002 dated Sep. 6, 2022.

Intellectual Property India, Examination Report Under Sections 12 & 13 of the Patents Act, 1970 and the Patents Rules, 2003 for Application 202117023846 dated Oct. 8, 2022.

Chinese Patent Office, Office Action for Chinese Patent Application No. 201980072316.2, dated Mar. 9, 2024.

Chinese Patent Office, Office Action for Chinese Patent Application No. 201980072316.2, dated Jan. 6, 2024.

Chinese Patent Office, Decision of Rejection for Chinese Patent Application No. 201980072316.2, dated Apr. 29, 2024.

* cited by examiner

METHOD FOR CHARGING AN ENERGY STORAGE SYSTEM USING A WIND TURBINE

TECHNICAL FIELD

The present disclosure relates to a method for charging an energy storage system using one or more wind turbines.

BACKGROUND

A wind turbine is a device that generates electrical power from wind energy. In effect, the kinetic energy from the wind is converted to electrical power via a generator in the wind turbine.

It is well understood that electrical power generation using wind turbines is limited by the availability of sufficient wind to drive the turbines. If there is no, or little, wind, the rotor of the turbines are unable to produce electrical power. In addition, if the wind speed is too high, it is unsafe to operate the wind turbines and, again, no power can be generated.

It is standard practice in the electrical energy generation industry for electricity grid owners/operators to require power generation companies to provide a forecast of how much power will be put onto the grid at least a day in advance. Deviations from the predicted power upload have negative financial implications. This presents a particular challenge to wind farm/park operators, as any power prediction relies on accurate weather forecasting, a discipline which is notoriously unreliable.

The rated power of a wind turbine is the maximum power output the wind turbine is able to deliver over a sustained period of time. The turbine can, for a limited time, be operated above this power level for a limited period of time, such periods are referred as power boosts.

To avoid deviating from the power generation prediction, it is known for wind turbine operators to operate the wind turbines below their rated power output in order to be able to increase power when required to better match the forecast.

In addition, it can be beneficial to operate the turbines at a power output below rated power to prevent excess wear and fatigue. Power boosts may be used to keep average power production high during periods with fluctuating winds.

It is also known for wind turbine operators to use back-up battery power to continue to provide electrical power to the grid during periods when the turbines are unable to generate power. Such batteries can be installed on each individual turbine, or can be installed as a separate system/sub-system of the wind farm/park. Of course, batteries can only supply power for a limited period of time before they must be re-charged.

Generally, the batteries are either re-charged by using electrical power generated by the wind turbines when they are again able to operate, or they are re-charged using power from the grid. In either case, re-charging of the batteries comes at a cost to the turbine operator as either, less power is available for sale to the grid, or the turbine operator has to purchase power from the grid.

SUMMARY OF THE INVENTION

The present invention provides a method of charging an energy storage system using a wind turbine, the method comprising: using a wind turbine to generate power; establishing if turbine power production can be increased; establishing if the energy storage system is capable of taking a charge; increasing the power generated by the wind turbine above a rated power of the wind turbine; and using the additional power generated by the power increase to charge the energy storage system.

The method of the present invention is advantageous as the wind turbine operator need not decrease power supply to the grid, or used power from the grid, in order to charge the batteries. The energy storage system may comprise at least one energy storage component, wherein the at least one energy storage component comprises any one from a group consisting of a battery, a capacitor, or a super capacitor. Any number of energy storage components may be used in any combination. The one or more energy storage components may be located on the wind turbine, or in a separate energy storage facility, or in any combination thereof.

Preferably, increasing the power generated may comprise creating a power boost.

In a preferred embodiment, increasing the power generated may comprise creating two or more power boosts, wherein the power generated by the wind turbine substantially returns to rated power between each power boost.

The or each power boost may have a predetermined duration. Alternatively, the or each power boost may be controllable in magnitude and/or duration. The control of the power boost may be dependent on operational parameters of the wind turbine or turbines or the energy storage system. In an embodiment, the power boost or boosts may be initiated and then interrupted once the energy storage system has reached a target state of charge. Alternatively or additionally, the power boost or boosts may be initiated and then interrupted if some other condition of the wind turbine, wind, or other ancillary systems become non-conducive to the continuation of the power boost. The or each power boost may have a predetermined maximum duration.

Two or more power boosts may be created within a predetermined period of time. Alternatively or additionally, there may be a predetermined minimum time period between each power boost.

In a preferred embodiment, the magnitude of the power increase may be a factor of the rated power.

Establishing if the energy storage system is capable of taking a charge may preferably comprise establishing a state of charge or operating temperature of the energy storage system.

Preferably, establishing if turbine power production can be increased may comprise establishing if the operating conditions of a convertor of the wind turbine are conducive to the creation of a power increase.

In a preferred embodiment, establishing the operating conditions of the convertor may comprise establishing an operating temperature or voltage of the convertor.

Establishing if turbine power production can be increased may preferably comprise establishing if the prevalent wind conditions are conducive to the creation of a power increase.

Preferably, establishing if the prevalent wind conditions are conducive to the creation of a power increase may comprise calculating or interrogating a standard deviation of the rotor speed.

In a preferred embodiment, establishing if turbine power production can be increased may comprise establishing if the operating speed of a generator or rotor, or a derived signal thereof, of the wind turbine is above a predetermined minimum.

A non-zero control signal may preferably be generated when the operating speed of the generator or rotor, or a derived signal thereof, is above the predetermined minimum, wherein the method further comprises suggesting a power increase each time the control signal changes from a zero to a non-zero state.

Preferably, establishing if turbine power production can be increased comprises sensing a vibration condition of the wind turbine and determining if the vibration condition is conducive to the to the creation of a power increase.

Preferably, establishing if turbine power production can be increased may comprise generating one or more control signals concerning the status of the wind turbine operating conditions; and establishing if the energy storage system is capable of taking a charge may comprise generating one or more control signals concerning the status of the energy storage system operating conditions; wherein the one or more control signals concerning the status of the wind turbine operating conditions and the one or more control signals concerning the status of the energy storage system operating conditions may be used by a master controller to determine if a power increase will be created.

In a preferred embodiment, a plurality of wind turbines may be used to charge the energy storage system.

At least one other power generator type may be used to charge the energy storage system Preferably, the master controller may request a power increase from one or more of the wind turbines in accordance with a control methodology which aims to provide a steady a charging power level to the energy storage system.

The master controller preferably requests a power increase from one or more of the wind turbines in accordance with a control methodology which aims to provide one or more power increases prior to a predicted deterioration in wind conditions conducive to the creation of a power increase. Prediction of wind condition deterioration may be achieved, for example by the use of Light Detection and Ranging (LiDAR) technology. Such a system is disclosed in EP2516849.

In a preferred embodiment, the power increase may be maintained until the energy storage system is substantially charged.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
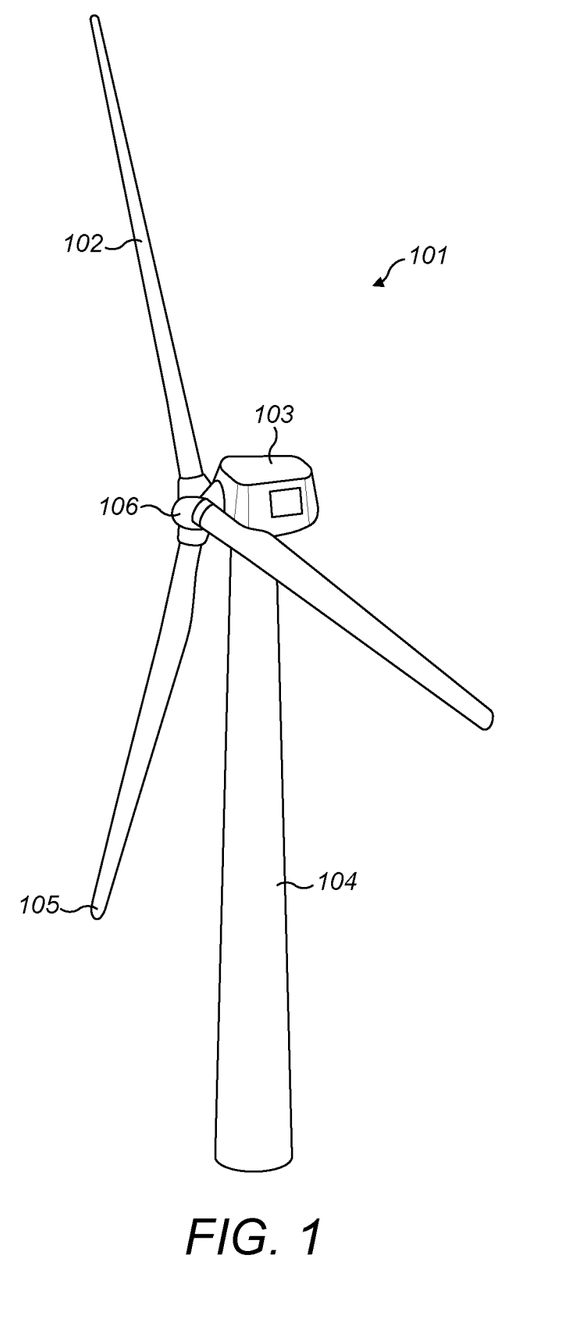
FIG. 1 shows a schematic view of a wind turbine.

FIG. 1 shows a schematic view of a typical wind turbine 101. The wind turbine 101 comprises a tower 104 which supports a nacelle 103. The nacelle 103 typically houses a generator and a convertor (not shown). A rotor 102 comprising blades 105 and hub 106 are mounted on the nacelle 103. A driveshaft (not shown) connects the hub 106 to the generator either directly, or via a gearbox. As the rotor 102 is driven by the wind, the driveshaft rotates causing the generator to generate electrical power. Ordinarily, a convertor is provided in the nacelle to convert the power generated into power having a frequency which matches that of a connected power grid.

Figure 2:
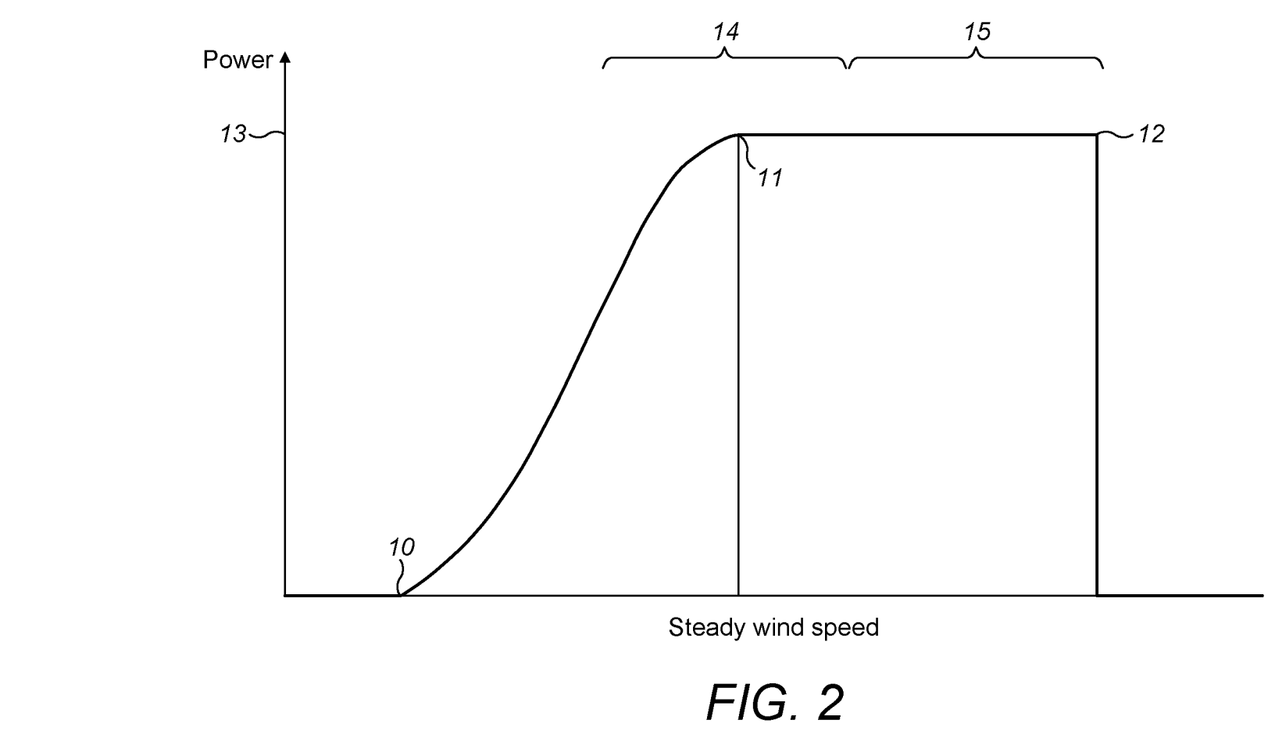
FIG. 2 shows a typical power curve for a wind turbine.

FIG. 2 shows a typical power curve of a horizontal axis wind turbine such as that shown in FIG. 1. Most wind turbines have a cut-in speed 10 below which the wind is too slow to cause rotation of the rotor 102. Between the cut-in speed 10 and the rated power output speed 11 the power generated by the wind turbine increases in a characteristic "S" shaped curve. Once the wind has reached the rated output speed 11, the rated power 13 generated by the wind turbine remains substantially constant until a cut-out speed 12 is reached above which it is unsafe to operate the wind turbine 101. As discussed above, the rated power of a wind turbine is the maximum power output the wind turbine is able to deliver over a sustained period of time.

A mid-regions 14 of the power curve is known as the "knee". Typically wind turbine designs are made such that there are a large amount of operating hours in this region which is a result of a cost-benefit analysis of changing rotor size and nominal power. Operation in the top end region 15 of the power curve is less common, but wind turbines do regularly operate in this region.

It is common in the wind power generation industry that the maximum average power level is lower than the short-term peak capability of the system. This is to provide the ability to boost the power generated as and when required. The operational power output of a wind turbine is known as its rated power. The short-term power capability of the power system would typically be between 0% and 10%.

The power output of a wind turbine may be controlled by a number of factors including blade 105 pitch angle and generator torque. Such control strategies are well understood in the art and are not discussed in detail here.

It will be appreciated that the power curve shown in FIG. 2 is an idealised curve. In reality the power output of the generator varies with time due to small changes in the forces driving the rotor 102. Such variations are illustrated by the example power output Vs time trace shown in FIG. 3.

Figure 3:
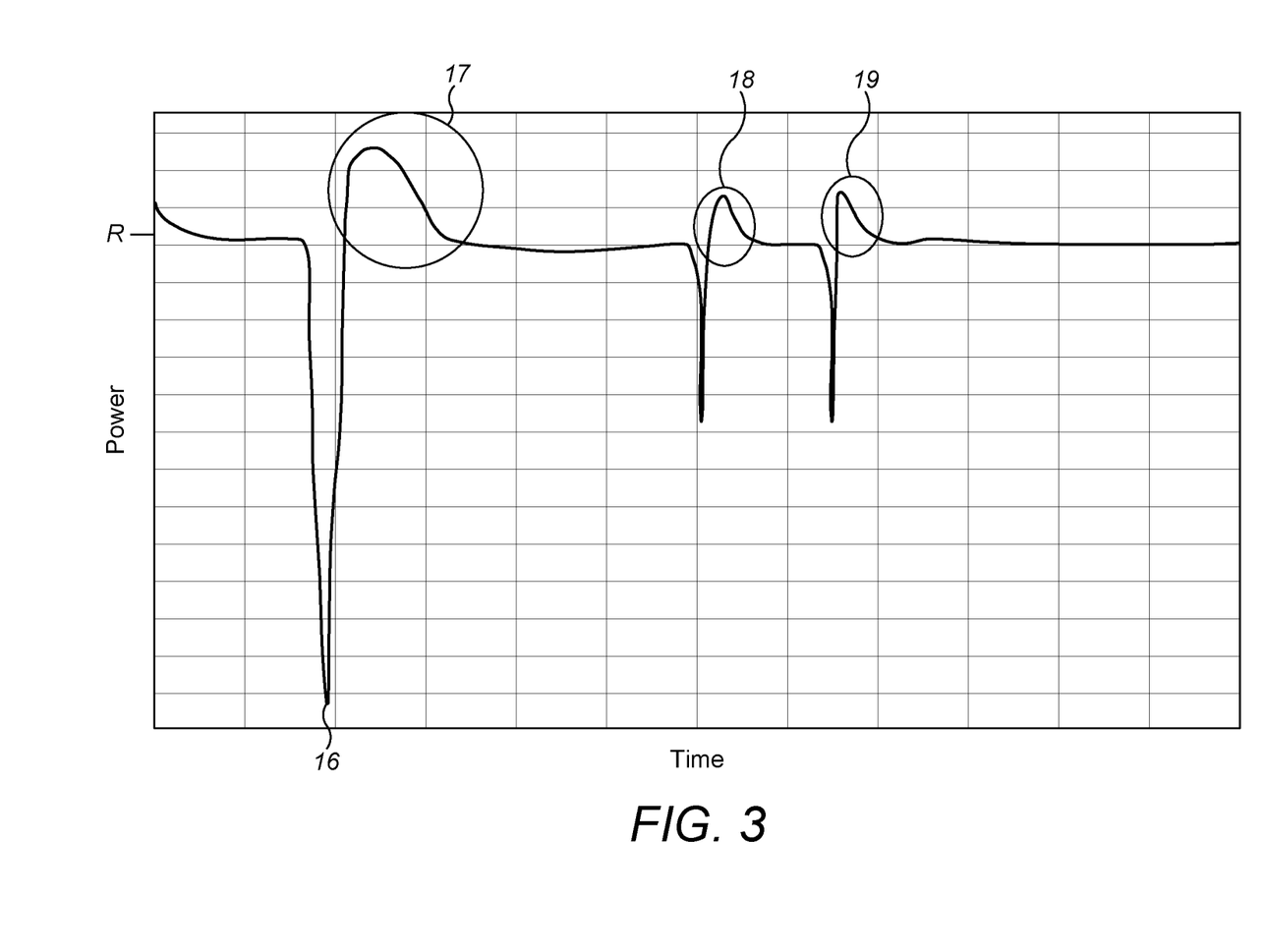
FIG. 3 shows an idealised example power output trace of a wind turbine over time.

As can be seen in FIG. 3, the power output from the wind turbine remains substantially constant at the rated power R until a time 16 when there is a significant drop in power output. This drop is caused by a drop in wind speed and an associated drop in rotor speed.

It will be understood that as the rotor 102 slows down its kinetic energy decreases. In order to recover the pre-drop power output levels, it is necessary to accelerate the rotor 102 back to its pre-drop speed once the wind speed has recovered.

As discussed above, under normal operating conditions, the wind turbine 101 is operated at its rated power output rather than at the maximum power output possible. However, in order to restore parts of the energy lost during the drop, it is beneficial to temporarily alter the wind turbine controls to allow the wind turbine to generate power at a level above its rated power level, thereby maintaining the average power production closer to rated power. This type of wind turbine control is well known in the art.

The effect of the power boost on the power output trace can be seen in FIG. 3 in circled region 17. Here it can be seen that the power output temporarily goes above the pre-drop power output level and then gradually returns to the pre-drop power level. Typically the power boost is set as a factor of the rated power, for example 101-125% of the rated power. The time duration of the power boost may be selected depending on the control strategy being used. An example duration of a power boost might be, for example, between 1 seconds and 10 minutes. Once the power boost ceases, the power output gradually declines, following an exponential decay, until the pre-drop power output is reached.

FIG. 3 also illustrates two additional power boost events in circled regions 18 and 19. Here the drop in wind speed is less than the drop in wind speed experienced at time point 16. Therefore, the drop in power output is less than that seen at time point 16. In this example, a smaller magnitude power boost is used to restore the rotor 102 speed. This is reflected in FIG. 3 by the smaller peak in the power output trace in regions 18 and 19. Of course, the magnitude and duration of the power boosts may be selected depending on the desired outcome and it is not necessarily the case that smaller drops in power will be compensated for by smaller and/or shorter power boosts.

Currently, power boosts are generally only used at wind speeds in the mid-region 14 of the power curve (FIG. 2). This is because the sensitivity of the power output to wind speed variations is considerably greater in the mid-region 14, or "knee", of the power curve. At wind speeds in the top region 15, dramatic power drops, such as that illustrated by region 17 of FIG. 3, are less common.

Power boosts are used to compensate for rotor overspeed in the event of a sudden rise in wind speed. They are also used if the grid unexpectedly needs additional power for some reason. For example, in the event that a source of electrical power goes down or if there is a sudden increase in power being taken from the grid by consumers. In such circumstances, the wind turbines can be controlled to generate power at a level above rated either by a series of discrete boosts, or by a continuous over rating until the extra power demand has been met. Of course, wind turbines can only be over rated if the wind speed is sufficient i.e. above rated output speed 11 (FIG. 2).

As discussed above, often batteries are used to compensate for the intermittency of wind conditions to meet the requirements of the grid or power forecast. It is clear that such batteries will need to be re-charged once their charge has been depleted. In one embodiment, the batteries may be charged by over rating one or more of the wind turbines and using the additional power generated to charge the batteries. In this way, the wind farm/park is able to continue to supply power to the grid at the forecasted level, and is also able to re-charge the batteries ready for use when required. However, as discussed below, this is not the preferred method of harnessing unused power generation capacity, or unused available wind power, as it is potentially damaging to the wind turbines and their components to operate for extended periods at, or near, maximum power output capability.

In another embodiment, one or more power boosts are created and the extra power generated by the power boosts is used to charge the batteries. Again, by using this method to charge the batteries, power can continue to be supplied to the grid at the forecasted level and the batteries can still be charged. An advantage of this method over the previous method is that the wind turbine is not over rated for extended periods of time. Thus, the wind turbine and its components are less likely to be damaged by excess wear or fatigue. In particular, the heat generated by the turbine components can be managed by appropriate selection of power boost magnitude, time interval and duration.

Figure 4:
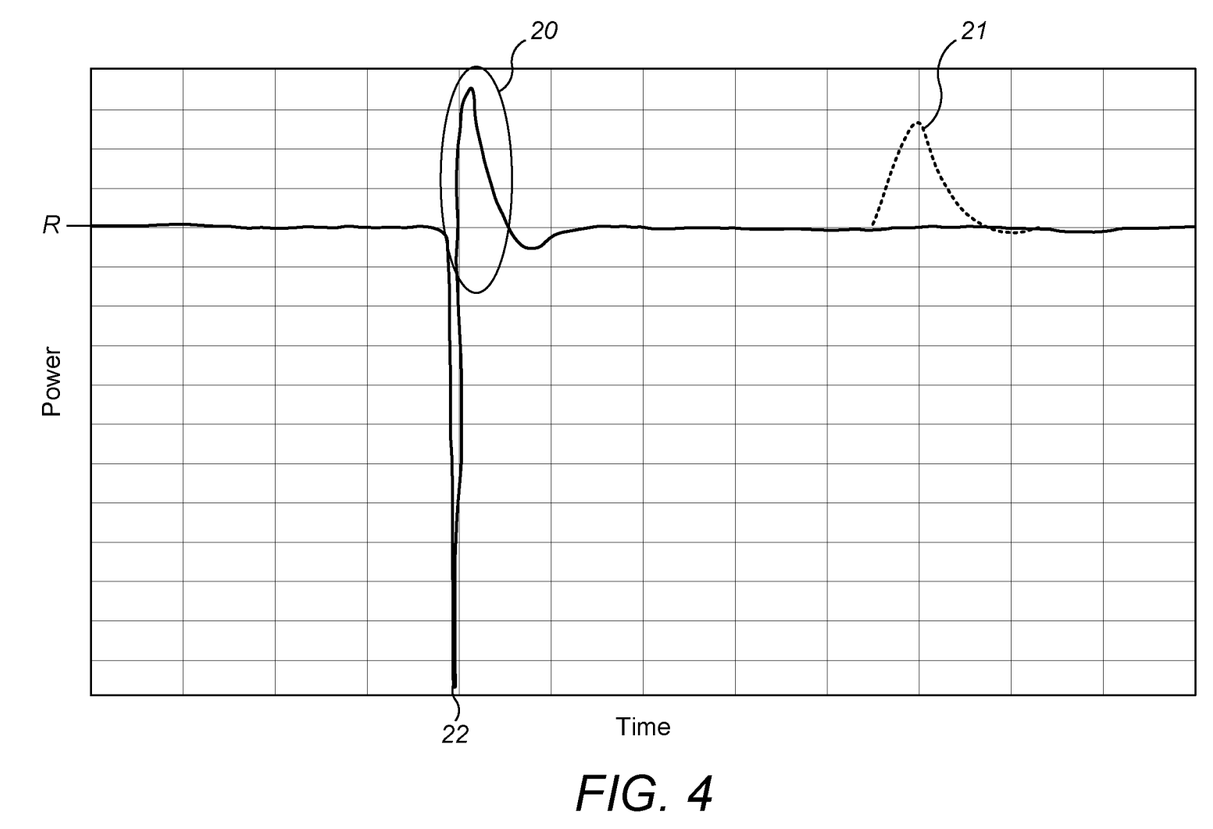
FIG. 4 shows another idealised example power output trace of a wind turbine over time.

FIG. 4 shows an example power output Vs time trace for a typical wind turbine having a rated power of R. Here it can be seen in circled region 20 that a power boost has been created to compensate for a power drop 22 caused by a drop in wind speed. A hypothetical power boost 21 has been superimposed on to the power trace at a time after the power boost 20. As can be seen in FIG. 4, there is no power drop preceding the power boost 21. Rather, the power boost 21 is created for the specific purpose of charging the batteries.

A power boost contains a certain amount of energy determined by the magnitude and duration of the boost. An amount of energy may be generated a number of times in any given time period. For example, 2-15 boosts may be created in a particular time interval as determined by the control logic as described in more detail below.

As will be appreciated by those skilled in the art, conditions are not always appropriate to create a power boost. Many factors have to be taken into consideration such as wind speed, wind stability, vibrational modes, generator speed and turbine operational conditions, Generator speed is determined by a number of factors including blade 102 pitch angle and generator torque. In normal operating conditions, at wind speeds above rated output speed 11, the power output of the wind turbine is controlled by a rotor speed controller which uses blade 102 pitch angle and generator torque (applied by the convertor) to maintain the generator speed within a range that results in a power output within an acceptable margin of the rated power output R of the wind turbine. There is typically a control feedback relationship between the blade pitch angle and the generator torque.

The creation of a power boost will produce a variation in the generator torque, and therefore some vibrational modes will be excited by the power boost. In one example, there may be a coordination between the start or end of a power boost and the state of deflection of the relevant vibration modes, such as to reduce the amplitude of the vibrations. For example, if the tower 104 is vibrating in a side-side bending mode, the start of the power boost will preferably be applied when its resulting torque variation will produce a reduction in the speed of the tower deflection. The appropriate time for start of power boost will be a function of the phase of the tower deflection. The phase of the tower deflection can be determined for example by use of accelerometers or load sensors. In another example, the rate of change in the power is also adjusted as a function of the phase of the modal deflection, such as to adjust or limit the frequency content of the power ramp.

Figure 5:
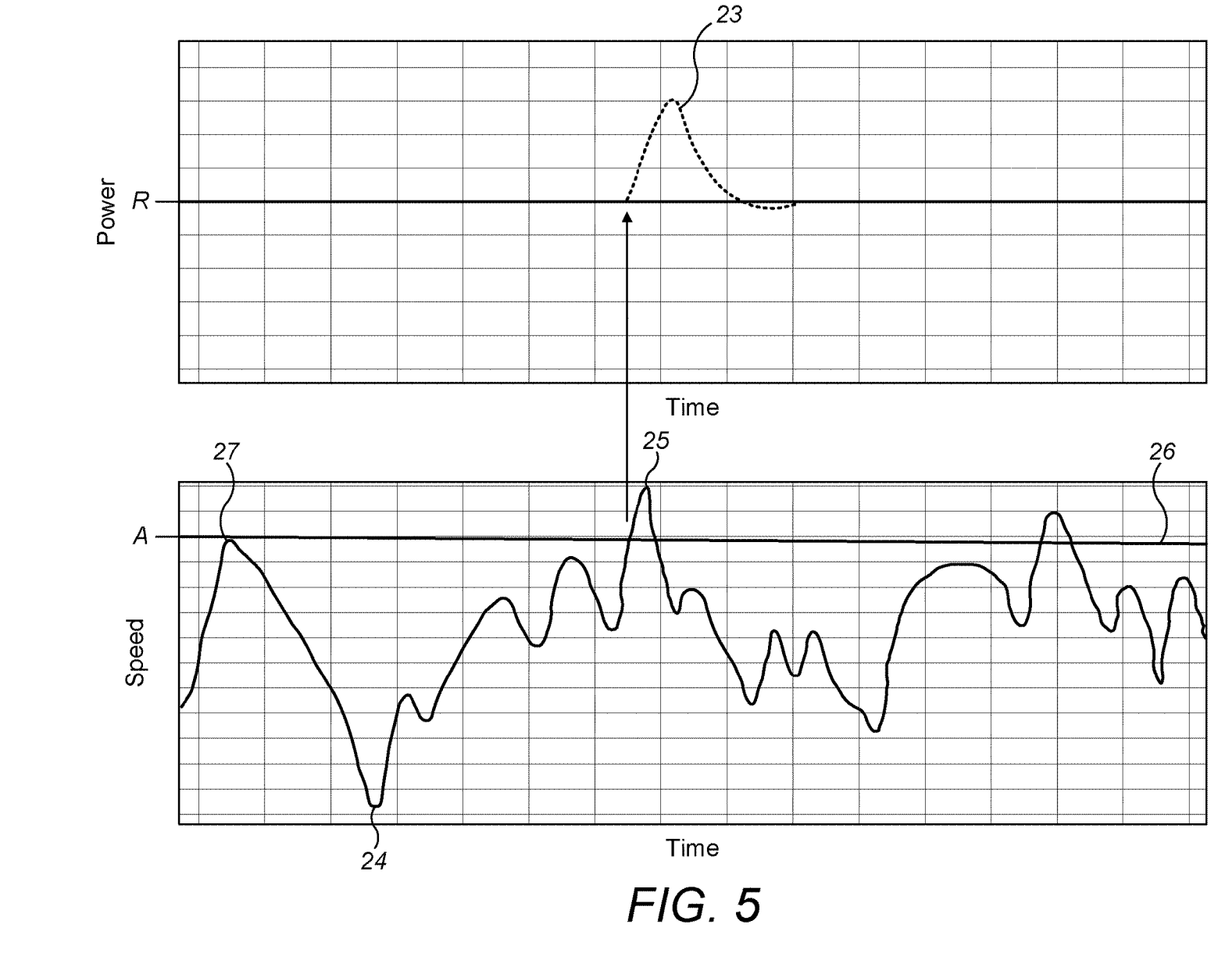
FIG. 5 shows an idealised example power output trace of a wind turbine over time together with an associated idealised example generator speed trace over time.

FIG. 5 shows an idealised power output Vs time trace for a typical wind turbine having a rated power R together with an idealised trace of an associated generator speed. A decrease in generator speed can be seen in the region of point 24. This decrease may be due to a drop in wind speed, or it may be due to additional torque having been applied to the generator to slow it down from the previous maximum at point 27. Generally speaking, it would not be desirable to apply a power boost at time position 24 since the boost would apply even more torque to the generator and cause the generator to slow even further. This would have a negative effect on the ability of the rotor speed controller to control the speed of the rotor/generator.

Conversely, referring again to FIG. 5, the generator speed in the region of point 25 is at a maximum. At this time point or during high acceleration it would be beneficial to apply a power boost as the additional torque created by the power boost would help to slow the speed of the generator and generate extra power at the same time. In one control strategy, a control signal may be generated each time the generator speed goes above a predetermined level, For example, in the system of FIG. 5, the predetermined generator speed may be "A" as indicated by line 26. Alternatively or additionally, the control signal may remain "on" for the entire period of time that the generator speed is above the predetermined speed 26. The control signal may, for example, be zero when the generator speed is below the predetermined speed 26, and may be a non-zero value, such as 1, when the generator speed is above the predetermined speed 26. Alternatively, or additionally, the control signal may change from a zero to a non-zero value in dependence on the acceleration of the generator, in which case, the control signal is determined by a derivative of the generator speed.

In another, or in an additional, control step, a controller of the wind turbine or wind farm/park may suggest that a power boost be created each time the control signal changes from a zero to a non-zero value. In this way, power boosts can be timed to occur when the generator speed is at a level conducive to the creation of a power boost (dependent on other system conditions as discussed below).

The prevailing wind conditions may be monitored by sensors, for example, by a LiDAR system such as that disclosed in EP2516849. In one optional example, a control signal may be changed from a zero to a non-zero state if it is predicted that the wind conditions will deteriorate such that the wind conditions are no longer conducive to the generation of power by the wind turbine. In such instances, the controller my request that a power boost be created in order to maximise the charge level of the batteries before the turbines cease to generate power from the wind.

Whether or not a power boost can be used to charge the batteries will depend upon a number of factors including, but not limited to: battery conditions (state of charge, temperature), wind conditions (speed, turbulence), convertor conditions (voltage temperature), wind turbine conditions (including vibrational modes), and rotor/generator speed. In addition, in another embodiment, it is possible that the battery or batteries may be charged from a number of wind turbines, each creating power boosts according to an overall control strategy which aims to supply the batteries with a steady charge level. Additionally, alternative power sources may be used to charge the batteries along with the wind turbines. Examples include photo voltaic cells or other renewable or non-renewable energy sources. In this case, additional power supplied to the batteries by such devices must be taken into account in the overall battery charging control system.

Figure 6:
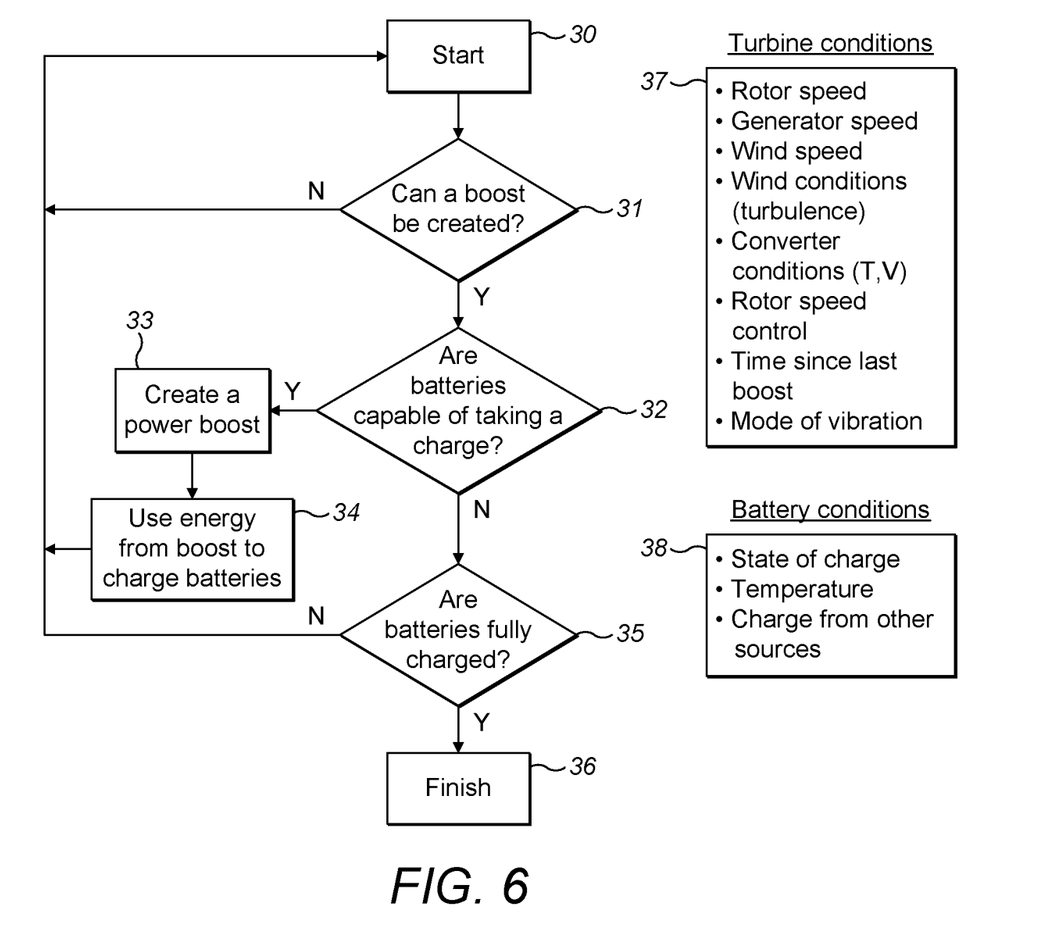
FIG. 6 shows a flow chart illustrating one possible method for charging an energy storage system using a wind turbine.

FIG. 6 shows a flow chart illustrating one possible process for charging one or more batteries using a wind turbine. The process starts at step 30. The first decision in the process is shown at step 31 where it is established whether or not it is possible to create a power boost. As indicated by the list in box 37, a number of inputs may be used to establish whether or not a boost may be created, Exemplary inputs include, but are not limited to: rotor/generator speed, wind speed, wind conditions (turbulence which may be ascertained from a standard deviation of the rotor speed as is well known in the art), vibrational conditions (such as tower bending), convertor conditions (voltage, temperature), rotor speed control (such as the zero/non-zero control signal discussed above in relation to FIG. 5), time elapsed since last boost. If it is established that a boost can be created the process moves on to step 32. If not, the process returns to step 30.

If a boost can be created, at step 32 it is established whether or not the one or more batteries are capable of taking a charge. As indicated by the list in box 38, a number of inputs may be used to establish whether or not the batteries can take a charge. Exemplary inputs include, but are not limited to: state of charge, temperature, charging power being received from other sources, if it is established that the batteries can take a charge, the process moves on to step 33. If not, the process moves to step 35 where it is established whether or not the batteries are fully charged. If they are, the process finishes at step 36. If not, the process returns to the start at step 30.

If the batteries are capable of taking a charge, wind turbine, or wind farm/park, supervisory logic instructs one or more of the wind turbines to create a power boost at step 33, and at step 34 the batteries are charged using the power from the power boost. The process then returns to the start at step 30.

It will be appreciated that at step 33 the supervisory logic must determine an appropriate magnitude and duration for the power boost or boosts. As discussed below with reference to FIG. 7, such determinations are made using the turbine condition inputs 37 and battery condition inputs 38 discussed above.

Figure 7:
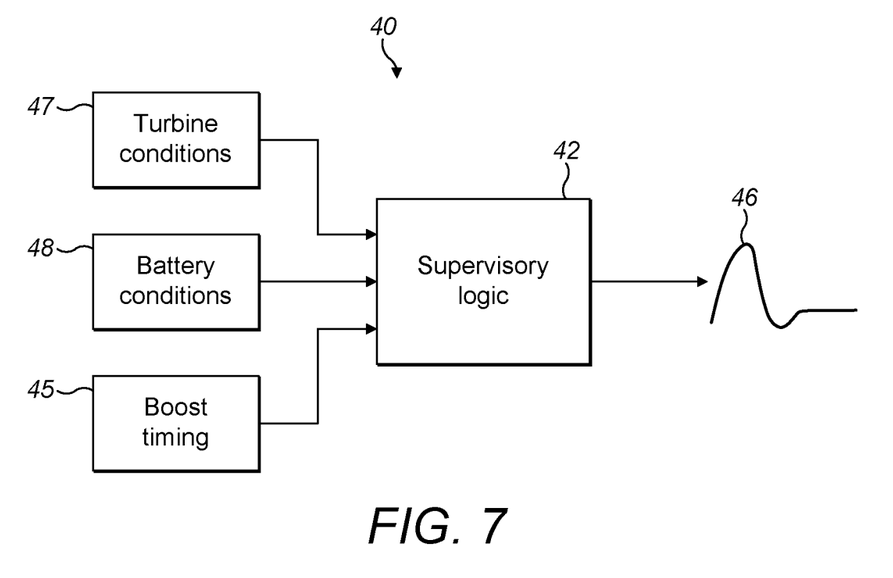
FIG. 7 shows a schematic of an exepia charge timing control system.

FIG. 7 shows a schematic of an exemplary charge timing control system 40. The system 40 comprises a supervisory logic 42 which receives inputs 47, 48 concerning the conditions of the turbine or turbines, and the battery or batteries. The turbine condition inputs 47 and battery condition inputs 48 correspond to the turbine condition inputs 37 and battery condition inputs 38 of FIG. 6. The supervisory logic 42 also receives boost timing inputs 45 which include, but are not limited to: boost timing information from all wind turbines in the system, rotor speeds, rotor/generator speed control signals (such as the zero/non-zero control signal discussed above in relation to FIG. 5). The supervisory logic 42 uses the information received concerning turbine conditions 47, the battery conditions 48, and the boost timing information 45. The supervisory logic determines which wind turbine or turbines will be boosted at which time to provide a battery charging boost 46.

As will be apparent to a person skilled in the art, the above described embodiments are examples only and there are many modifications which may be made without departing from the scope of the invention. In particular, in the above examples, batteries are used as the primary component of an energy storage system, It is not essential that the energy storage system comprise batteries and any suitable energy storage component may be used. Suitable energy storage components comprise batteries, capacitors and super capacitors. The energy storage system may comprise any number of energy storage components and any combination of energy storage components may be used together as part of the same energy storage system. The energy storage system may comprise energy storage components which are turbine mounted, or which are located in a separate energy storage facility. In some examples, some energy storage components may be turbine mounted while other energy storage components are located in a separate energy storage facility.

The invention claimed is:

1. A method of charging an energy storage system using a wind turbine, the method comprising:
generating power with the wind turbine, the wind turbine having a generator;
monitoring, by sensors, prevailing wind conditions;
determining, at a first instance of time, the power generated by the wind turbine can be increased above a rated power based on an operating speed of the wind turbine;
in response to the determining, determining whether the energy storage system is capable of taking a charge;
in response to determining the energy storage system is not capable of taking the charge:
determining the energy storage system is not fully charged;
in response to determining the energy storage system is not fully charged, determining, at a second instance of time occurring after the first instance of time, the power generated by the wind turbine can be increased above the rated power based on the operating speed of the wind turbine; and
re-determining whether the energy storage system is capable of taking the charge; and
in response to determining the energy storage system is capable of taking the charge:
increasing the power generated by the wind turbine above the rated power of the wind turbine in order to maximize a charge level of the energy storage system; and
using additional power generated by the power increase to charge the energy storage system.

2. The method of claim 1, wherein the energy storage system comprises at least one energy storage component, wherein the at least one energy storage component comprises any one from a group consisting of a battery, a capacitor, or a super capacitor.

3. The method of claim 1, wherein increasing the power generated comprises creating two or more power boosts, wherein the power generated by the wind turbine substantially returns to rated power between each power boost.

4. The method of claim 3, wherein there is a predetermined minimum time period between each power boost.

5. The method of claim 3, wherein each power boost has a predetermined maximum duration.

6. The method of claim 1, wherein a magnitude of the power increase is a factor of the rated power.

7. The method of claim 1, wherein determining that the energy storage system is capable of taking a charge is further based on an assessment of a voltage of a converter.

8. The method of claim 1, wherein determining that turbine power production can be increased comprises establishing whether prevalent wind conditions are conducive to a creation of a power increase.

9. The method of claim 8, wherein establishing whether the prevalent wind conditions are conducive to the creation of a power increase comprises calculating or interrogating a standard deviation of a rotor speed.

10. The method of claim 1, wherein determining that turbine power production can be increased comprises determining that an operating speed of the generator or rotor, or a derived signal thereof, of the wind turbine is above a predetermined minimum.

11. The method of claim 10, wherein a control signal is generated in a non-zero state when the operating speed of the generator or rotor, or the derived signal thereof, is above the predetermined minimum, wherein the method further comprises suggesting a power increase each time the control signal changes from a zero state to the non-zero state.

12. The method of claim 1, wherein establishing if turbine power production can be increased comprises sensing a vibration condition of the wind turbine and determining if the vibration condition is conducive to the creation of a power increase.

13. The method of claim 1, wherein:
determining that turbine power production can be increased comprises generating one or more control signals concerning a status of the wind turbine operating conditions; and
determining that the energy storage system is capable of taking a charge comprises generating one or more control signals concerning the status of the energy storage system operating conditions; and
wherein the one or more control signals concerning the status of the wind turbine operating conditions and the one or more control signals concerning the status of the energy storage system operating conditions are used by a master controller to determine if a power increase will be created.

14. The method of claim 13, wherein a plurality of wind turbines is used to charge the energy storage system.

15. The method of claim 14, wherein the master controller requests a power increase from one or more of the wind turbines in accordance with a control methodology which aims to provide a steady a charging power level to the energy storage system.

16. The method of claim 13, wherein at least one other power generator is used to charge the energy storage system.

17. The method of claim 1, wherein determining that the energy storage system is capable of taking a charge further comprises establishing a state of charge or operating temperature of the energy storage system.

18. The method of claim 1, wherein the power generated by the wind turbine is increased above the rated power of the wind turbine by a series of discrete boosts until an extra power demand has been met.

19. The method of claim 1, wherein determining whether the energy storage system is capable of taking the charge is based on charging power the energy storage system is receiving from another wind turbine or a photovoltaic cell.

20. A system, comprising:
an energy storage system;
a wind turbine having a tower; and
a controller, wherein the controller is configured to:
generate power with the wind turbine; and
determine, at a first instance of time, the power generated by the wind turbine can be increased above a rated power based on an assessment of a vibrational mode of the wind turbine;
in response to the determining, determine whether the energy storage system is capable of taking a charge;
in response to determining the energy storage system is not capable of taking the charge;
determine the energy storage system is not fully charged;
in response to determining the energy storage system is not fully charged, determine, at a second instance of time occurring after the first instance of time, the power generated by the wind turbine can be increased above the rated power based on another assessment of the vibrational mode of the wind turbine; and in response to determining, at the second instance of time, the power generated by the wind turbine can be increased above the rated power, re-determine whether the energy storage system is capable of taking the charge; and in response to determining the energy storage system is capable of taking the charge:

increase the power generated by the wind turbine above the rated power of the wind turbine; and use additional power generated by the power increase to charge the energy storage system, and wherein a start of the power increase is a function of a phase of a tower deflection associated with the tower of the wind turbine.

21. The system of claim 20, wherein when the tower is vibrating in a side-side bending mode, the controller is configured to start the power increase when a resulting torque variation produces a reduction in a speed of the tower deflection.

22. A wind turbine controller configured to:

generate power with a wind turbine; and determine, at a first instance of time, the power generated by the wind turbine can be increased above a rated power based on an assessment of a vibrational mode of the wind turbine;

in response to the determining, determining whether an energy storage system is capable of taking a charge;

in response to determining the energy storage system is not capable of taking the charge:

determine the energy storage system is not fully charged;

in response to determining the energy storage system is not fully charged, determine, at a second instance of time occurring after the first instance of time, the power generated by the wind turbine can be increased above the rated power based on another assessment of the vibrational mode of the wind turbine; and in response to determining, at the second instance of time, the power generated by the wind turbine can be increased above the rated power, re-determine whether the energy storage system is capable of taking the charge; and in response to determining the energy storage system is capable of taking the charge:

increase the power generated by the wind turbine above the rated power of the wind turbine; and use additional power generated by the power increase to charge the energy storage system, and wherein a rate of change of the power increase is adjusted as a function of a phase of a modal deflection associated with the vibrational mode of the wind turbine.

* * * * *